(12) United States Patent
Hannon et al.

(10) Patent No.: US 11,639,095 B2
(45) Date of Patent: May 2, 2023

(54) POWER SYSTEM FOR A VEHICLE

(71) Applicant: Dana Belgium N. V., Bruges (BE)

(72) Inventors: Bert Hannon, Bruges (BE); Joachim Van Dingenen, Drongen (BE)

(73) Assignee: Dana Belgium N.V., Bruges (BE)

( * ) Notice: Subject to any disclaimer, the term of this patent is extended or adjusted under 35 U.S.C. 154(b) by 11 days.

(21) Appl. No.: 17/454,553

(22) Filed: Nov. 11, 2021

(65) Prior Publication Data
US 2022/0144072 A1    May 12, 2022

(30) Foreign Application Priority Data

Nov. 11, 2020  (DE) ..................... 20 2020 106 473.8

(51) Int. Cl.
| | |
|---|---|
| B60K 6/48 | (2007.10) |
| B60K 6/365 | (2007.10) |
| B60K 6/387 | (2007.10) |
| B60K 6/40 | (2007.10) |
| F16H 37/08 | (2006.01) |
| B60K 17/346 | (2006.01) |
| B60K 25/00 | (2006.01) |

(52) U.S. Cl.
CPC ............... B60K 6/48 (2013.01); B60K 6/365 (2013.01); B60K 6/387 (2013.01); B60K 6/40 (2013.01); F16H 37/0806 (2013.01); B60K 17/346 (2013.01); B60K 2006/4825 (2013.01); B60K 2025/005 (2013.01); B60Y 2200/92 (2013.01); F16H 2200/0017 (2013.01); F16H 2200/2005 (2013.01); F16H 2200/2094 (2013.01)

(58) Field of Classification Search
None
See application file for complete search history.

(56) References Cited

U.S. PATENT DOCUMENTS

| | | |
|---|---|---|
| 6,258,006 B1 | 7/2001 | Hanyu et al. |
| 6,416,437 B2 | 7/2002 | Jung |
| 9,441,708 B2 | 9/2016 | Kimes et al. |
| 9,562,592 B2 | 2/2017 | Rekow et al. |

(Continued)

FOREIGN PATENT DOCUMENTS

| | | | |
|---|---|---|---|
| CN | 111376699 A | * | 7/2020 |
| DE | 102019200966 A1 | * | 7/2020 |

(Continued)

OTHER PUBLICATIONS

CN 11376699 A1 translation (Year: 2019).*

(Continued)

*Primary Examiner* — Dirk Wright
(74) *Attorney, Agent, or Firm* — McCoy Russell LLP

(57) ABSTRACT

A power system for a vehicle comprising: a first engine, a second motor/generator, and a third motor/generator. The system further comprising: a first gearset with a first power train section coupled to an input side of the first gearset and a second power train section coupled to an output side of the first gearset. A mode selection device comprising at least two positions: a first position of the mode selection device coupling the third motor/generator to the first power train section, and a second position coupling third motor/generator to the second power train section. A clutch selectively connecting the first machine and the first power train section.

16 Claims, 2 Drawing Sheets

(56) References Cited

U.S. PATENT DOCUMENTS

| | | | |
|---|---|---|---|
| 9,702,437 B2 * | 7/2017 | Lee | F16H 3/66 |
| 10,006,529 B2 | 6/2018 | Haka et al. | |
| 10,077,823 B2 * | 9/2018 | Ai | F16H 3/728 |
| 10,457,134 B2 | 10/2019 | Morrow et al. | |
| 10,780,769 B1 * | 9/2020 | Cho | B60K 6/36 |
| 2018/0031085 A1 | 2/2018 | Steinberger et al. | |
| 2019/0291711 A1 | 9/2019 | Shukla et al. | |

FOREIGN PATENT DOCUMENTS

| | | | |
|---|---|---|---|
| EP | 1199204 A1 | 4/2002 | |
| WO | WO-2018174881 A1 * | 9/2018 | |

OTHER PUBLICATIONS

WO 2018174881 text (Year: 2019).*
DE 102019200966 A1 translation (Year: 2019).*
Dingenen, J. et al., "Vehicle Transmission and Method for Operation of Said Transmission," U.S. Appl. No. 16/882,152, filed May 22, 2020, 26 pages.
Dingenen, J. et al., "Vehicle Transmission With an Inter-Axle Differential and Method for Operation of Said Inter-Axle Differential," U.S. Appl. No. 16/882,228, filed May 22, 2020, 28 pages.

* cited by examiner

POWER SYSTEM FOR A VEHICLE

CROSS-REFERENCE TO RELATED APPLICATION

The present application claims priority to German Utility Model Application No. 20 2020 106 473.8, entitled "POWER SYSTEM FOR A VEHICLE", and filed on Nov. 11, 2020. The entire contents of the above-listed application is hereby incorporated by reference for all purposes.

TECHNICAL FIELD

The subject matter of the present disclosure is applicable in the field of automotive technology and comprises a concept for power transmission.

BACKGROUND AND SUMMARY

Modern vehicles are oftentimes not only driven by a combustion engine but additionally comprise an electrical machine or engine or, more generally, a type of machine that is different from a combustion engine.

Different concepts are known to implement a coupling or combination of different engines or machines in the power transmission of a vehicle.

For example, US 2019/0291711 relates to a method of operating a first and a second engine in a vehicle power transmission system.

U.S. Pat. No. 6,416,437 discloses a vehicle with two electric motors and a combustion engine.

U.S. Pat. No. 6,258,006 relates to a power transmission for a hybrid vehicle.

EP 1 199 204 discloses a drive for a tractor with a combination engine and two electric motors.

Thus, there is demand for a power system for a vehicle that can be implemented with high modularity and low complexity.

A power system for a vehicle is presently proposed, the power system comprising a first machine, such as a combustion machine, which is releasably coupled to a first power train section, a second, electric machine, such as an electric motor which drives a second power train section, and a third, electric machine, such as an electric motor,
wherein both the first and second power train sections are coupled in or via a first gearset to a third power train section, which is coupled directly or indirectly to at least one first set of wheels,
wherein the first gearset allows for a flexible ratio of speed of the first power train section and the second power train section and
wherein the third machine is coupled to a mode selection device, wherein the mode selection device has at least two positions and wherein in a first position of the mode selection device, the third machine is releasably coupled to the first power train section.

This power system can be implemented in a modular way, wherein each of the second and third electric machines may be an exchangeable module comprising an electric motor, potentially an inverter and potentially also a control unit and a battery. The second and third machines may also be used as a generator and may be connected to one and the same battery of the vehicle.

The first machine may be a conventional combustion machine fueled by gas or liquid gas.

The first, second and third power train sections may be implemented each as a module comprising a shaft, a combination of shafts or a combination of shafts, coupling elements, clutches and potentially gearwheels or gears.

The first gearset may be a module with a mechanical gear, wherein a planetary gear is an attractive realization.

The mode selection device may be realized as a module comprising a clutch, a combination of clutches, a combination of one or more clutches with a gear, or the like.

Each of the modules mentioned above may be realized in one or more specific ways and may fit together and work together with the other modules according to the needs and requirements of a specific vehicle that is to be equipped.

The third machine may be directly and releasably coupled by the mode selection device with the first power train section and thereby may be coupled with the input side of the first gearset.

Further, the third machine may also be releasably or non-releasably coupled with a first additional power take-off, which provides power for any additional aggregate of the vehicle.

An implementation of the present disclosure further relates to a power system wherein in a second position of the mode selection device, the third machine is releasably coupled to the third power train section.

This way, in the second position of the mode selection device, the third machine can be directly coupled with the output side of the first gearset and with one or both wheel sets.

A further implementation relates to a power system, where the mode selection device has three positions, wherein in a first position of the mode selection device, the third machine is releasably coupled to the first power train section, wherein in a second position of the mode selection device, the third machine is releasably coupled to the third power train section and wherein in a third position of the mode selection device, the third machine is decoupled from both the first and third power train sections.

This version of the mode selection device describes a set of positions that can be chosen if the modular mode selection device comprises, for example two clutches or a clutch with three positions. This kind of mode selection device may as well comprise a number of gears or a gearbox with a clutch.

It may also be provided that the mode selection device is a clutch.

The present disclosure may further be implemented by a system where the first gearset is a planetary gear with a sun gear, at least one planet gear supported by a planetary gear carrier, and a ring gear.

A planetary gear is an elegant solution for a gear that allows for active driving of the gear at two separate input interfaces and drives a power train section at an output interface wherein the two input interfaces may be driven with different speed and a flexible relation of speeds. The different interfaces may be coupled with a sun gear, a ring gear and a planetary gear or planetary gear carrier.

A further implementation may provide that one of the first power train section and the second power train section is coupled to the sun gear and the other is coupled to the ring gear, wherein the third power train section is coupled to the carrier.

Further, as already mentioned above, it may be provided that the third, electric machine is coupled to a first additional power take-off.

The present disclosure may further provide that the third power train section is coupled directly or indirectly to a second set of wheels and/or to a second additional power take-off. In this way, the power system may provide opportunities to implement a front wheel drive, rear wheel drive and an all-wheel drive with the possibility to switch between the different drive modes.

In a further implementation, it may be provided that the first power train section and/or the second and/or third power train section each comprises at least one countershaft gear and one or more wet clutches. This implementation may be more complicated than a planetary gear, but in some cases may be easier to implement or more flexible.

A further implementation may provide that a first and second wheel set are either rigidly connected with each other or disconnectable via a dog clutch or connected via an inter-axle differential wherein the inter-axle differential may include a lock-up functionality. These different options of coupling between the wheel sets may improve efficiency and reduce tire wear. It is, however, even more comfortable if the different modes can be chosen flexibly by a driver.

It is a further option for the present disclosure that at least one of the first and second wheel set is releasably coupled to the other wheel set by an inter-axle differential with the possibility of a lock-up.

This implementation allows for coupling and decoupling between the wheel sets, which has advantages in some driving conditions.

It may also be provided that the first machine is coupled to the first power train section by a clutch or by a gear and clutch arrangement, which allows for a change of the rotational direction of the first power train section.

This construction allows for a flexible change of the rotation direction of the first power train section.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE FIGURES

In the following, the present disclosure will be illustrated by drawings showing specific implementation examples that will be explained further below.

DETAILED DESCRIPTION

Figure 1:
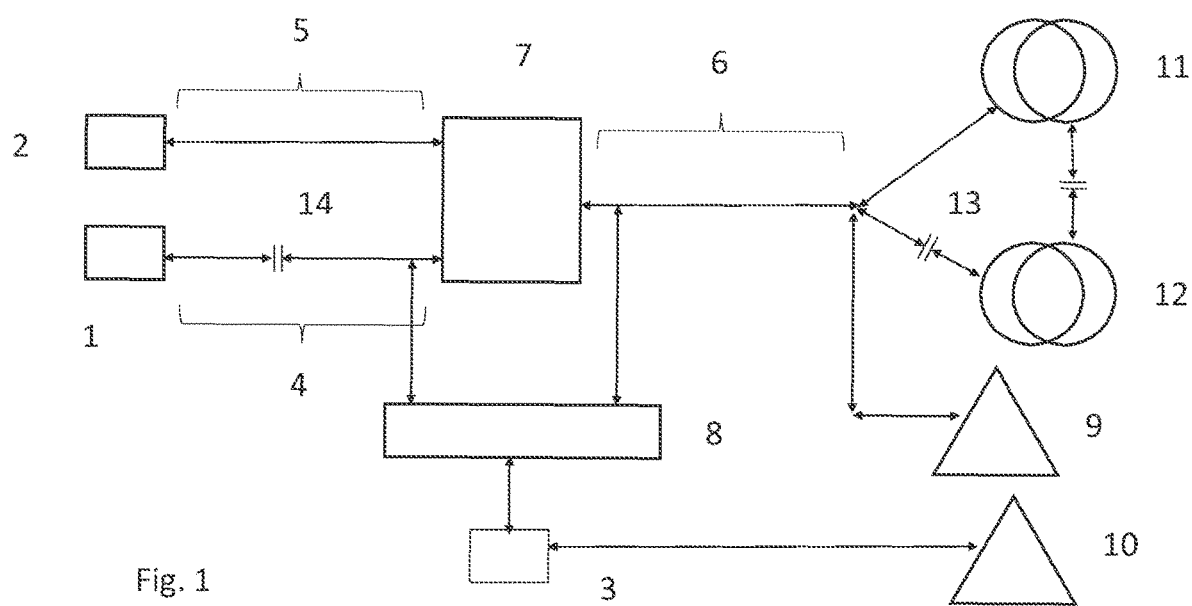
FIG. 1 shows an abstract diagram of the modular concept of the present disclosure and FIG. 2 shows a more concrete implementation example in a stick diagram.
Figure 2:
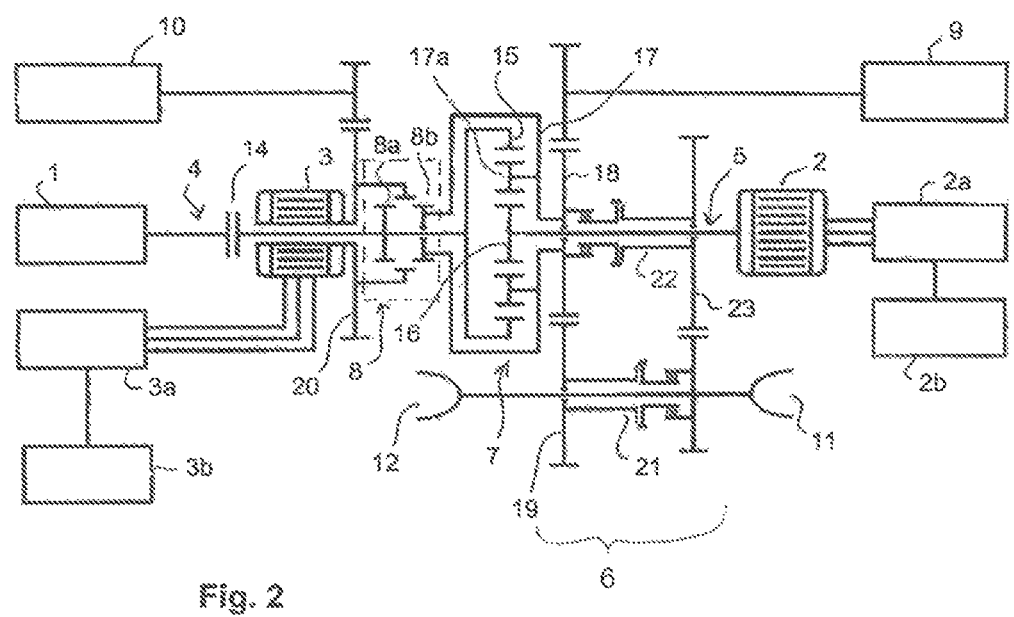

FIG. 1 shows in an abstract, schematic view a power system for a vehicle with a first machine 1, which in most cases will be a combustion engine, and a second machine 2, which typically is an electric motor that can also be used as a generator. The electric motor 2 is connected to a battery, potentially to an inverter and to a control unit, as shown in FIG. 2.

The first machine 1 drives a first power train section 4, and the second, electric machine 2 drives a second power train section 5. The first and/or second power train sections 4, 5 may comprise one or more shafts. They may also comprise gears or other elements that can transmit motion.

In the first power train section 4 an element 14 is provided that allows for coupling and decoupling of the first machine 1 to and from the first gearset 7. The element 14 may also allow for an inversion of the direction of rotation, and in this case, element 14 may be implemented as a gear. Generally, element 14 may also be a clutch.

The first and second power train sections 4, 5 are coupled with each other in the first gear set 7, which may be realized as a planetary gear. The first and second power train sections 4, 5 may act as a motion input or input of kinetic energy to the first gearset 7. The first gearset 7 is also coupled to a third power train section 6, which acts as a power or kinetic energy output. The third power train section 6 is coupled to at least one set of wheels 11. The third power train section 6 may also be coupled releasably to a second set of wheels 12.

A releasable clutch in the connection between the third power section 6 and the second set of wheels 12 is marked by 13. The third power train section 6 may also be coupled with a first power take-off 9. The said first power take-off 9 may be used to drive an additional aggregate of the vehicle.

A third machine 3, typically implemented as an electric engine, which can work in a motor or a generator mode, is provided and coupled with a mode selection device 8. The mode selection device 8 has at least two positions: in the first position, said mode selection device releasably couples the third machine 3 with the first power train section 4. In the second position, the mode selection device 8 couples the third machine 3 with the third power train section 6. In this way, the third machine 3 can support one or more of the first and second machines in different modes. The third machine 3 may also be coupled to a second power take-off 10, which may serve to drive a second additional aggregate in the vehicle.

The first set of wheels 11, which may be the front wheel set or the rear wheel set, is coupled to the second set of wheels 12, which may be the rear wheel set or the front wheel set. The coupling between the two wheel sets 11, 12 may be implemented as an inter-axle differential. Here, the inter-axle differential is included or implemented in the transmission.

The mode selection device 8 may be implemented as a gear, or a gear with one or more clutches, or as a clutch with two or three positions. In the first position, as explained above, the mode selection device connects the third machine with the first power train section, and in the second position the mode selection device 8 connects the third machine with the third power train section. In an intermediate, third position the mode selection device decouples the third machine from the power train sections.

In FIG. 2, the power system for a vehicle is shown in a more concrete implementation. FIG. 2 shows the power system according to the present disclosure in an additional representation that is more concrete in some aspects than the representation of FIG. 1.

The first machine 1 drives the first power train section 4. The first power train section 4 comprises a clutch 14 that allows for decoupling of the first machine from the first power train section 4 and for reverting the direction of rotation of the first power train section. The first power train section 4, comprising a shaft, is connected with a ring gear 15 of the planetary gear 7. The second, electric machine 2 drives the second power train section 5 comprising a shaft that is connected to the sun wheel 16 of the planetary gear 7. The planetary gear carrier 17 of the planetary gear 7 is driven by the ring gear 15 and the sun gear 16 and is connected to a first wheel set 11 by a first output gear 18 and a second output gear 19. Furthermore, the planetary gear carrier is connected to a second part 8b of the mode selection device 8 that can be releasably coupled with the third machine 3. The first part 8a of the mode selection device can be coupled with the third machine 3 as well, depending on the position of the mode selection device. The mode selection device 8 as a whole is represented by dotted lines in FIG. 2. It generally comprises of a movable clutch.

The second electric machine 2 is electrically connected to an inverter 2a, which is connected to a battery 2b. The third machine 3 is connected to an inverter 3a, which is connected to a battery 3b. The batteries 2b and 3b may be one and the same device. The third machine 3 is coupled to a second power take-off 10 by a gear 20. On the output side of the planetary gear 7, the gear 18 is coupled to a first power take-off 9. The second wheel set 12 is connected by a shaft with the first wheel set 11. Between the first and second wheel sets 11, 12, a gear and/or a clutch 21 may be provided. A gear and/or clutch 22 may also be provided between the gear 18 on the output side of the planetary gear 7 and the gear 23. The gear 23 is coupled to the gear 18 and on the other side transmits power to the first set of wheels 11.

Overall, the elements of the power system according to the present disclosure are set up in a modular fashion such that each module may be replaced by another module that fulfills the same or a similar function. The three different machines may be used to drive the vehicle in different drive mode by coupling the different machines on different levels or at different points of the power train.

Furthermore, the elements of the power system are arranged in a sequential fashion and may each be provided in an individual housing. Thus, individual elements may be easily replaced without changing the entire system. Specifically, elements such as the electric motor/generators, planetary gear set, combustion engine, or other gears may be individually replaced based on intended use. For example, electric motors and gears may have high speed ratios for highway use but be replaced by components with low speed ratios for off-road use while the remaining components of the system remain the same.

The speed provided to the wheels and the efficiency of the powertrain may be varied by adjusting the positions of the mode selection device 8 and the mode selection device. Furthermore, the operation of the combustion machine and each of the electric machines may be varied to provide further variation of wheel speed and efficiency within different operation modes provided by the positions of the mode selection device 8 and clutch 14.

As shown above, an embodiment of the system includes a first power train section coupled to a ring gear of the planetary gearset and a second power train section coupled to the sun wheel of the planetary gearset. The second, electric machine 2 is connected to the second power train section and therefore the sun wheel.

The third, electric machine 3 is coupled to the mode selection device 8 which in a first position couples the third, electric machine 3 to the first power train section and therefore to the ring gear. In a second position of the mode selection device 8, the third, electric machine 3 is coupled to a planet gear carrier of the planetary gear set. The mode selection device 8 may also have a neutral position wherein the third, electric machine 3 is not coupled to the powertrain.

In the above embodiment, a clutch 14 selectively connects the first, combustion machine to the first power train section and therefore the ring gear.

The positions of the mode selection device 8 and the clutch 14 may be used to determine one of many operation modes of the vehicle.

In a parallel hybrid mode, the mode selection device 8 is in a neutral position, the clutch 14 is in an engaged position, and the first, combustion machine and the second, electric machine 2 provide power to the wheels.

In an electric mode, the mode selection device 8 is in the first position, the clutch 14 is a disengaged position, and the second, electric machine 2 and the third, electric machine 3 provide power to the wheels. The operation of the second, electric machine 2 and the third, electric machine 3 can be varied within the electric mode to provide variable power output and efficiency within the electric mode.

In a first power-split mode, the mode selection device 8 is in the first position, and the first, combustion machine 1, the clutch 14, the second, electric machine 2, and the third, electric machine are selectively operated to provide variable speed and efficiency output. The operation of the first, combustion machine 1, clutch 14, the second, electric machine 2 and the third, electric machine 3 can be varied to provide variable power output and efficiency within the first power-split mode.

In a second power-split mode, the mode selection device 8 is in the second position, and the first, combustion machine 1, the clutch 14, the second, electric machine 2, and the third, electric machine are selectively operated to provide variable speed and efficiency output. The operation of the first, combustion machine 1, clutch 14, the second, electric machine 2 and the third, electric machine 3 can be varied to provide variable power output and efficiency within the second power-split mode.

Furthermore, the third, electric machine 3 is connected to the ring gear 15 of the planetary gear set in the first power-split mode in comparison to being connected to the planetary carrier 17 in the second power-split mode. This variable connection of the third, electric machine 3 allows for further variation of the power output and efficiency. As one example, the second power-split mode may be used for low wheel speed operation whereas the first power-split mode may be used for high wheel speed operation.

This variability of operation mode may allow for the first machine, the second, electric machine 2, and the third, electric machine 3 to be operated within their most efficient operating conditions. As just one example, the first, combustion machine 1 which is a combustion engine in the above embodiment may be kept within the operating conditions which provide efficient combustion, such as Atkinson cycle.

The variability of operation mode and variability of each machine within each operation mode may also be used as a replacement for a conventional transmission with variable gear ratios. In embodiments herein, the output of the planetary gear to the wheels may have a fixed ratio.

Furthermore, the second, electric machine 2 and third, electric machine 3 may be each be operated in a generator mode. The second, electric machine 2 and the third, electric machine 3 may also be electrically connected, for example by a common battery. Therefore, one of the second, electric machine 2 or third, electric machine 3 may be operated as a generator while the other of the machines is used to drive the wheels. Furthermore, the power produced by the generator could be used by the other machine to drive the wheels. For example, in the first power-split mode, the third, electric machine 3 could be used to drive the wheels and the second, electric machine 2 could be used as a generator. However, the electric power generated by the second, electric machine 2 could be used by the third, electric machine 3 to drive the wheels.

FIGS. 1 and 2 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

It will be appreciated that the configurations and routines disclosed herein are exemplary in nature, and that these specific embodiments are not to be considered in a limiting sense, because numerous variations are possible. Moreover, unless explicitly stated to the contrary, the terms "first," "second," "third," and the like are not intended to denote any order, position, quantity, or importance, but rather are used merely as labels to distinguish one element from another. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A power system for a vehicle comprising:
   a first machine, wherein the first machine is a combustion machine;
   a first gearset with a first power train section coupled to an input side of the first gearset, a second power train section coupled to an output side of the first gearset, and a third power train section coupled coupling the first gearset to at least one first set of wheels;
   a second, electric machine connected to the second power train section, and
   a third, electric machine coupled to a mode selection device,
   the mode selection device comprising at least two positions: a first position of the mode selection device coupling the third, electric machine to the first power train section, and a second position coupling the third, electric machine to the second power train section
   a clutch selectively connecting the first machine and the first power train section
   positions of the mode selection device and the clutch determining an operation mode of the vehicle:
      in a parallel hybrid mode, the mode selection device is in a neutral position and the clutch is in an engaged position
      in an electric mode, the mode selection device is in the first position, the clutch is a disengaged position, and the second, electric machine and the third, electric machine provide power to the wheels
      in a first power-split mode, the mode selection device is in the first position and the clutch is engaged,
      in a second power-split mode, the mode selection device is in the second position and the clutch is engaged.

2. The power system according to claim 1, wherein in the second position of the mode selection device, the third, electric machine is releasably coupled to the third power train section via a planetary gear carrier.

3. The power system according to claim 1, wherein the mode selection device has three positions, wherein in the first position of the mode selection device, the third, electric machine is releasably coupled to the first power train section via a ring gear, wherein in a second position of the mode selection device, the third, electric machine is releasably coupled to the third power train section via a planetary gear carrier and wherein in a third position of the mode selection device, the third, electric machine is decoupled from both the first and third power train sections.

4. The power system according to claim 1, wherein the first gearset is a planetary gear with a sun gear, at least one planet gear supported by a planetary gear carrier, and a ring gear.

5. The power system according to claim 4, wherein one of the first power train section and the second power train section is coupled to the sun gear and the other is coupled to the ring gear and wherein the third power train section is coupled to the a planetary gear carrier.

6. The power system according to claim 1, wherein the mode selection device is a clutch.

7. The power system according to claim 1, wherein the third, electric machine is coupled to a first additional power take-off.

8. The power system according to claim 1, wherein the third power train section is coupled directly or indirectly to a second set of wheels and/or to a second additional power take-off.

9. The power system according to claim 1, wherein the first power train section and/or the second and/or the third power train section each comprises at least one countershaft gear and one or more wet clutches.

10. The power system according to claim 1, wherein a first and second wheel set are either rigidly connected with each other or disconnectable via a dog clutch or connected via an inter-axle differential, the inter-axle differential preferably including a lock-up functionality.

11. The power system according to claim 1, wherein the clutch allows for a change of the rotational direction of the first power train section.

12. A power system for a vehicle comprising:
a first machine, wherein the first machine is a combustion machine;
a planetary gearset;
a first power train section coupled to a ring gear of the planetary gearset;
a second power train section coupled to a sun gear of the planetary gearset;
a third power train section coupled coupling the planetary gearset to at least one first set of wheels;
a second, electric machine connected to the second power train section, wherein the second, electric machine is an electric machine;
a third, electric machine coupled to a mode selection device, wherein the second, electric machine is an electric machine;
the mode selection device comprising at least two positions: a first position of the mode selection device coupling the third, electric machine to the first power train section, and a second position coupling the third, electric machine to a planet gear carrier;
a clutch selectively connecting the first machine and the first power train section
positions of the mode selection device and the clutch determining an operation mode of the vehicle:
in a parallel hybrid mode, the mode selection device is in a neutral position, the clutch is in an engaged position, and the first machine and the second, electric machine provide power to the wheels;
in an electric mode, the mode selection device is in the first position, the clutch is a disengaged position, and the second, electric machine and the third, electric machine provide power to the wheels;
in a first power-split mode, the mode selection device is in the first position, and the first machine, the clutch, the second, electric machine, and the third, electric machine are selectively operated to provide variable speed output;
in a second power-split mode, the mode selection device is in the second position, and the first machine, the clutch, the second, electric machine, and the third, electric machine are selectively operated to provide variable speed output.

13. The power system of claim 12, wherein in the first power-split mode or the second power-split mode, the second, electric machine or third, electric machine may operate in a generator mode while the other of the second, electric machine or third, electric machine operates in a drive mode.

14. The power system of claim 12, wherein a ratio between an output of the planetary gearset to the wheels is fixed, and operation in the first power-split mode and the second power-split mode provide different speed output to the wheels.

15. The power system of claim 12, wherein a ratio between an output of the planetary gearset to the wheels is fixed, and variable operation of at least one of the second, electric machine and third, electric machine provides different speed output to the wheels.

16. The power system of claim 14, wherein a ratio between an output of the planetary gearset to the wheels is fixed, and variable operation of at least one of the second, electric machine and third, electric machine provides different speed output to the wheels within each of the first power-split mode and the second power-split mode.

* * * * *